United States Patent Office 3,595,604
Patented July 27, 1971

3,595,604
PROCESSES FOR WHITENING AND RETARDING SUNLIGHT YELLOWING OF PROTEIN FIBERS BY TREATMENT WITH A FLUORESCENT BRIGHTENING AGENT, THIOUREA, AND A SOURCE OF FORMALDEHYDE
Geoffrey William Evans, West Brunswick, Victoria, Australia, Adam Sinclair Inglis, Upton, N.Y., and Walter Ernest Savige, Jacana, Victoria, and Vincent Aloysius Williams, Belmont, Victoria, Australia, assignors to Commonwealth Scientific and Industrial Research Organization, East Melbourne, Victoria, Australia
No Drawing. Filed Oct. 3, 1967, Ser. No. 672,433
Claims priority, application Australia, Oct. 4, 1966, 12,008/66
Int. Cl. D06m 3/02, 13/00
U.S. Cl. 8—127.6                              6 Claims

ABSTRACT OF THE DISCLOSURE

A process for whitening and reducing sunlight yellowing of wool, silk, and other protein fibers in which the fibers are treated with an aqueous solution containing a fluorescent brightening agent and subsequently treated with aqueous solutions of thiourea and a source of formaldehyde. The process may be combined with known bleaching, shrinkproofing, dyeing, and other textile fiber treatments.

---

This invention relates to an improved process for whitening and retarding yellowing of protein fibres by sunlight.

One of the main disadvantages of protein fibres, such as wool or silk compared with many synthetic textile fibres, is the tendency to become yellow and to become weaker, on prolonged exposure to direct sunlight. This tendency is enhanced if the protein fibres have been bleached and/or treated with fluorescent brightening agents or if exposure is effected in the wet state. The change in shade of protein fibres dyed in pastel colours, during sunlight exposure, is also due, at least in part, to yellowing of the fibres.

A number of processes have been described for reducing the rate of yellowing of protein fibres by sunlight, but none affords complete protection. One process consists in treating silk or other protein fibres with a thiourea-formaldehyde precondensate, the impregnated fibres being then dried, and finally heated in order to form thiourea-formaldehyde resin on the fibres. Although this process confers considerable protection against sunlight yellowing, it also confers an undesirable harsh handle or feel to the fibres. The protective effect was believed to be due in both antioxidant activity of resins based on thiourea and to the power of thiourea-formaldehyde resin to absorb the ultraviolet rays in sunlight which are responsible for yellowing.

It has recently been found, however, that the use of a resin precondensate is not necessary in order to protect protein fibres against yellowing, and accordingly it is possible to use a simplified process for the above-mentioned purpose, such as the process described by B. Milligan and D. J. Tucker in Textile Research Journal 34, 681 (1964). In this process, the yellowing of wool, silk and other protein fibres, which occurs during exposure to sunlight, is retarded by treating the fibres with an aqueous solution containing both thiourea and formaldehyde. Thiourea may be replaced by a substituted thiourea; for example, N-methylthiourea, N,N'-dimethylthiourea, or ethylenethiourea, used in conjunction with formaldehyde, all confer protection against sunlight yellowing.

As the treatment does not involve the deposition of preformed resin on the fibres, the wool or other material treated according to our invention does not develop the harsh handle so characteristic of material treated according to previously known processes.

The present invention is concerned with improvements and modifications of the above described process.

For convenience, the further description of our invention will be made in connection with the treatment of wool. The process is, however, also applicable to silks and other protein fibres and the description should be read accordingly. References in the following general description and claims to "a thiourea" are also to be read as including substituted thioureas, such as those mentioned above; methylolthioureas and disulphides of thiourea.

We have found that sources of bound formaldehyde may also be used with thiourea to impart a protective effect to wool against sunlight yellowing. Although formaldehyde or paraformaldehyde are used in the preferred forms of the invention, a protective effect can also be obtained by using 1,3-dimethylolimidazolidone-2 (commonly known as dimethylol ethylene urea), methylolated hydroxyethyl carbamate, or tetrakis (hydroxymethyl) phosphonium chloride. Substances of this type which can give rise to formaldehyde under appropriate conditions together with paraformaldehyde and formaldehyde itself for convenience will be referred to in the following general description and claims as "a source of formaldehyde."

We have also found that when wool, which has previously been treated with a fluorescent brightening agent, is treated with thiourea or a combination of thiourea, or a derivative thereof, and formaldehyde, or a source of bound formaldehyde the whitening effect of the fluorescent brightening agent is enhanced.

Thus, in accordance with one aspect of the present invention there is provided a process for whitening wool, silk and other protein fibres, which process comprises the application of a fluorescent brightening agent to the fibres and simultaneously or subsequently treating the fibres with a thiourea or a mixture of a thiourea and a source of formaldehyde.

Furthermore, we have now found that when wool, treated with a fluorescent brightening agent, is treated with a thiourea and a source of formaldehyde as described above the accelerating effect on yellowing normally produced by such an agent is greatly diminished. The degree of "yellowing" or fading of the fluorescent brightening agent which normally occurs with wool is also greatly reduced.

Thus, in accordance with a further aspect of the present invention there is provided a process for whitening and retarding the yellowing of wool, silk and other protein fibres and in the preferred form this process comprises the application of a fluorescent brightening agent to the fibres and simultaneously or subsequently treating the fibres with a thiourea and a source of formaldehyde as described above.

We have also found that treatment of peroxide bleached wool fibres with a polyvalent metal cation, prior to or in conjunction with the above treatment also enhances whiteness imparted by the fluorescent brightening agent.

Accordingly in a further aspect the process of the invention comprises the application to the wool, silk or other protein fibres of a solution of a polyvalent metal cation, prior to or in conjunction with a treatment with a fluorescent brightening agent and with a thiourea and a source of formaldehyde.

We have also found that thiourea and formaldehyde (and their derivatives) are compatible with the resin baths used in the shrinkproofing processes described in our copending U.S. patent applications Ser. Nos. 633,977 and 387,519, now abandoned.

Thus, the present invention may be employed to provide a process for simultaneously shrinkproofing, whitening and retarding sunlight yellowing of wool, in which a thiourea and a source of formaldehyde are applied in conjunction with a shrinkproofing resin. The wool may be whitened by prior, concurrent or later application of sodium hydrosulphite, preferably stabilised, and fluorescent brightening agent if desired.

The whitening and protective process according to our invention may also conveniently be linked with an oxidative shrink-resist process. The usual reductive after-treatment can be modified to produce a reductive bleach and fluorescent brightener can also be added.

Treatment with oxidative shrink-resist agents, such as permanganate, permonosulphate or dichloroisocyanuric acid or its salts, according to known procedures may be followed by whitening the wool in a follow-on bath by treatment with reducing agents such as stabilised sodium hydrosulphite. Fluorescent brightening agent may be added to the bath if desired, and the wool is then treated with a thiourea and a source of formaldehyde to enhance the white effect and retard sunlight yellowing.

Wool dyed in pastel colours may also be treated with thiourea-formaldehyde solutions to minimise colour change occurring on exposure to sunlight. We have further found that after dyeing, wool treated according to our invention still retains a protective effect against sunlight yellowing.

Thus, another aspect of the invention provides a process for treating wool to obtain pastel shades having improved light fastness, which process comprises the application of a thiourea and a source of formaldehyde before or after dyeing. To improve the clarity of shade, a reductive bleach may be performed and fluorescent brightening agent added at the same time as dyeing, but oxidative bleaching is not desirable.

The treatments may be carried out by padding the wool, either in the form of fabric or slubbing, with the appropriate solution or solutions. Alternatively, the wool may be treated by immersion. The treatments are most effective if the wool is used directly, without washing, but although the protective effect is reduced somewhat if the wool is rinsed or washed in soap or detergent solution, it is not reduced further by subsequent or prolonged washing.

Satisfactory results can be obtained by both padding and immersion techniques of treating the fibres with an aqueous solution containing a thiourea and a source of formaldehyde, in which techniques the fibres are treated by (a) heating in the said solution at or near the boiling point of water, and drying; or
(b) padding with the said solution and heating the padded fibres in air at a temperature near the boiling point of water and subsequently drying; or
(c) padding with the said solution, and drying by methods commonly used in the textile industry, such as in an air oven at or near 80° C. for 5 to 10 minutes.

We have also found that in the above-described procedures the thiourea and source of formaldehyde may be applied separately, provided the thiourea is applied first and at least the thiourea is applied from a solution of dilute formic acid at pH 1–2. Under these conditions, the drying step which is usually required may be dispensed with. This procedure constitutes a further modification of our invention.

In all cases, the concentrations of both thiourea and formaldehyde in the solution can be varied widely without markedly affecting the effectiveness of the process. Concentrations of thiourea in the range 10 to 50 g./litre and of formaldehyde in the range 10 to 200 g./litre (or the equivalent amounts of their derivatives) have been found to be quite effective. The process is most effective if the thiourea-formaldehyde solution has a pH value in the range 4–9, or if formic acid is used, pH 1–2.

The fluorescent brightening agent, if applied separately to the wool, is best applied from an aqueous solution, preferably in the presence of a suitable reducing agent of known type. Suitable brightening agents are those of the pyrazoline, stilbene, coumarin and triazine types, and include those manufactured under the trade names "Lumicol WFG," "Leucophor PAF," "Photine HV" (FBA 213, C.I. New Supp. No. 22), "Photine LV" (FBA 215, C.I. New Supp. No. 22), "Pontamine LBTW," "Uvitex RT" (FBA 37, C.I. II 5915), "Tinopal RP" (FBA 104, C.I. 5609), "Blankophor BA" (FBA 113, C.I. 5611), "Blankophor REU" (FBA 119, C.I. 5612), "Mikephor WK," and "Fluolite XNR." The usual application technique is by exhaustion from solution, e.g. by heating the wool for about 30 minutes in a solution of the brightening agent and a reducing agent. Preferably the wool is maintained at pH 4 to 5, and the brightening agent is present in an amount corresponding to 0.1 to 1.0% on the weight of wool.

The metal cation may be applied conveniently by soaking the wool in a solution of salt containing the cation for a suitable time, for aluminium soaking for ½ to 1 hour in a 0.5% aqueous solution of aluminium sulphate is sufficient. A wetting agent may be added if desired.

Wool, previously bleached with hydrogen peroxide, may also be treated in accordance with any of the above-desired processes, but it is not advisable to bleach wool with hydrogen peroxide *after* treating it with thiourea-formaldehyde and/or fluorescent brightening agent solutions. Shrink-resist wool may also be effectively treated by our process.

Our process, as applied to wool which has not been fluorescently brightened, is particularly effective in retarding the very rapid yellowing which occurs when wool is exposed wet to sunlight. This occurs when woollen fabrics or garments are hung to dry in the sun after laundering. Thus the useful life of a woollen fabric may be prolonged by a factor of 7 or 8 before it is considered to be objectionably discoloured, if first treated by our process. The process confers slightly less protection against yellowing of dry fabrics, but nevertheless it may prolong the useful life by a factor of 3.

In addition to minimising yellowing produced during exposure to sunlight, treatment in accordance with our process also minimises the loss in mechanical strength of exposed fibres, and treated fabrics therefore are not weakened to the same extent by sunlight irradiation as untreated fabrics. Unlike some processes aimed at minimising sunlight yellowing, our process does not discolour the wool, and in some instances, produces a slight bleaching effect.

The invention is illustrated, but not limited by, the following examples.

EXAMPLE 1

Wool fabric was bleached by treatment in hydrogen peroxide (4 vol.) and sodium pyrophosphate (0.4% w./v.) for 2 hours at 50° C., followed by treatment with stabilised hydrosulphite (0.4% w./v.) for 4 hours at 50° C., and then rinsed and dried.

A sample was then padded to retain 100% on the weight of wool of a solution of thiourea (1%) and paraformaldehyde (4%) and then air dried.

On exposure to direct sunlight the treated sample yellowed much less rapidly than the bleached wool.

EXAMPLE 2

Wool fabric was bleached with peroxide and hydrosulphite as in Example 1. A sample was then padded to retain 100% on the weight of wool of a solution of thiourea (1%) and methylolated hydroxyethyl carbamate (4%), and then air dried.

On exposure to direct sunlight the treated sample yellowed much less rapidly than the bleached wool.

EXAMPLE 3

Wool fabric was bleached with peroxide and hydrosulphite as in Example 1. A sample was then padded to retain 100% on the weight of wool of a solution of thiourea (1%) and tetrakis (hydroxymethyl) phosphonium chloride (4%), and then air dried.

On exposure to direct sunlight the treated sample yellowed much less rapidly than the bleached wool.

EXAMPLE 4

Wool fabric was bleached by treatment in a bath (40 to 1 liquor to wool ratio) of stabilised sodium hydrosulphite (0.4% w./v.) solution for 4 hours at 50° C., and then rinsed and dried.

A sample of the bleached fabric was then padded to retain 100% on the weight of wool of a solution of thiourea (2.5%) and formaldehyde (10%), and then air dried.

The sample was then washed in a compounded anionic detergent (0.2% w./v.) for 10 minutes at 50° C., rinsed and dried.

Test strips of the treated sample and bleached wool were then exposed to direct sunlight, together with test strips of the blue wool cloths used to assess colour fastness to light in British Standard 1006: 1961, and Australian Standard L15/2.

Light fastness ratings for the bleached wool, exposed wet and dry, were 3 and 4 respectively. The sample treated with thiourea-formaldehyde yellowed at a much slower rate, and had light fastness ratings of 5 and 5, wet and dry, respectively.

EXAMPLE 5

Wool fabric was bleached by treatment with stablilised sodium hydrosulphite as in Example 4, and then treated with Colour Index Fluorescent Brightening Agent 37 (2%) according to the manufacturer's directions, and then rinsed and dried.

A sample was then padded to retain 100% on the weight of wool of a solution of thiourea (1%), and dried at 80° C. The padded sample was whiter than the bleached and brightened wool.

EXAMPLE 6

Wool fabric was bleached by treatment with stablilised sodium hydrosulphite as in Example 4, and then treated with Leucophor PAF (1% on wt. of wool), thiourea (2.5% on wt. of wool) and formaldehyde (10% on wt. of wool) in a bath at 60° C. for 90 minutes, and then rinsed and dried.

The wool was whiter than samples which had been treated similarly but with the omission of the thiourea and formaldehyde.

EXAMPLE 7

Wool fabric was bleached by treatment with stablilised sodium hydrosulphite as in Example 4, and then treated with Colour Index Fluorescent Brightening Agent 113 (1%) in a bath at 60° C. for 45 minutes, and then rinsed and dried.

A sample was then padded to retain 100% on the weight of wool of a solution of thiourea (2.5%) and formaldehyde (10%), and air dried.

The padded sample was whiter than the bleached and brightened wool, and on exposure to sunlight yellowed much less rapidly than the bleached and brightened wool.

EXAMPLE 8

Wool fabric was bleached by treatment with stabilised sodium hydrosulphite as in Example 4 and then treated with Colour Index Fluorescent Brightening Agent 104 (0.8%) and acetic acid (1.6%) in a bath at 60° C. for 30 minutes and then rinsed and dried.

A sample was then padded to retain 100% on the weight of wool of a solution of thiourea (1%) and formaldehyde (4%) and dried at 80° C.

The padded sample was whiter than the bleached and brightened wool, and on exposure to sunlight yellowed much less rapidly than the bleached and brightened wool.

EXAMPLE 9

Wool fabric was padded to retain 100% on the weight of wool of a solution of pH 4.5 containing formaldehyde (10% w./v.), thiourea (2.5% w./v.), stabilised sodium hydrosulphite (2.5% w./v.), Leucophor PAF (0.5% w./v.), acetic acid (2% w./v.) and nonionic wetting agent (0.05% w./v.). The fabric was then heated in a steam oven at 80° C. for 30 minutes, and dried in a circulating air oven at 105° C. for 15 minutes.

The above fabric was whiter and had a better light fastness than samples which had been treated similarly but with the omission of thiourea and formaldehyde.

EXAMPLE 10

A piece of wool fabric (10 g.) was treated with a fluorescent brightening agent in the presence of 0.05% wetting agent and stabilised hydrosulphite or sodium formaldehyde sulphoxylate at pH 4–6 according to the recommendations given by the manufacturers of the particular brightener. The fabric was well wrung out (approx. 60% expression) impregnated with a solution of 35% w./v. formaldehyde (100 ml.) and thiourea (5 g.) in water (100 ml.) at room temperature and then again wrung out (100% expression). The wet fabric was heated in a steam oven at 90° C. for 15 min. and then dried in a circulating air oven at 105° C. for 15 min.

Samples of fabric, treated as above, were exposed to direct sunlight at the same time as samples of brightened fabric which had not been after-treated with thiourea/formaldehyde. The treated fabrics become discoloured much less rapidly than the untreated fabrics.

EXAMPLE 11

A piece of wool fabric (10 g.) was bleached with alkaline hydrogen peroxide according to methods currently used in the wool industry. The fabric was rinsed with water, wrung out (60% expression) and soaked for 30 min. in a 0.5% solution of aluminium sulphate (1 litre). The fabric was again wrung out to 60% expression and then treated with a solution of thiourea/formaldehyde and Leucophor PAF as described in Example 9.

The treated samples were whiter and had a higher light fastness than corresponding samples treated with Leucophor PAF/hydrosulphite but without aluminium and thiourea/formaldehyde treatments.

EXAMPLE 12

Wool shirting fabric was treated with a salt of dichloroisocyanuric acid according to methods currently used in the wool textile industry, and then treated in a bath with sodium bisulphite (1% on wt. of wool) for 10 minutes at 35° C. and bleached and brightened in the same bath by treatment with stabilised sodium hydrosulphite (8% on wt. of wool) for 30 minutes at 50° C. then with Fluolite XNR (0.5% on wt. of wool) for 45 minutes at 90° C., and then rinsed and dried. The fabric was then padded to retain 100% on the weight of wool of a solution of thiourea (4%) and formaldehyde (4%), and dried at 80° C.

The treated wool was whiter and on exposure to sunlight yellowed much less rapidly than wool which had been treated similarly but with the omission of the thiourea and formaldehyde.

EXAMPLE 13

Wool fabric was scoured, bleached with stabilised sodium hydrosulphite and dyed with 0.05% Alizarine Brilliant Sky Blue R (Colour Index Acid Blue 62) according to the manufacturer's directions.

A sample was then padded to retain 100% on the weight of wool of a solution of thiourea (4%) and formaldehyde (4%), and dried at 80° C.

On exposure to sunlight the sample yellowed and changed shade less rapidly than wool treated similarly but with the omission of thiourea and formaldehyde.

It will be appreciated that modifications, other than those described, can be made to the process of the invention. For example, it is possible to combine the thiourea/formaldehyde treatment with other textile finishing processes; a particular example is the use of a thiourea/formaldehyde treatment in conjunction with scouring, carbonising, moth-proofing or softening processes. Thiourea and formaldehyde can conveniently be added to the baths employed in these processes.

It is therefore to be understood that the invention includes these and other modifications which fall within its spirit and scope.

We claim:

1. A process for whitening and/or retarding the sunlight yellowing of wool, silk or other protein fibres which process comprises the steps of:
   (a) treating the fibres with an aqueous solution containing a fluorescent brightening agent in an amount of from 0.1 to 1.0% based on the weight of the fibres, and
   (b) subsequently treating said fibres with thiourea and a source of formaldehyde selected from the group consisting of formaldehyde, paraformaldehyde and substances capable of producing formaldehyde under the treatment conditions; the thiourea being applied from an aqueous solution containing from 10 to 50 g./litre of thiourea, and said source of formaldehyde being applied from an aqueous solution containing the equivalent of 10 to 200 g./litre of formaldehyde.

2. The process of claim 1, wherein the fluorescent brightening agent is applied to the fibres by exhaustion from an aqueous solution which is maintained at a pH of about 4 to 5.

3. The process of claim 1, wherein the treated fibres are then heated to about the boiling point of water.

4. The process of claim 1, wherein the treated fibres are then dried at about 80° C. from 5 to 10 minutes.

5. The process of claim 1, wherein step (b) is carried out by first applying to the fibres an aqueous solution containing the thiourea and subsequently applying to the fibres an aqueous solution containing the source of formaldehyde, at least the first said aqueous solution comprising dilute formic acid and having a pH of 1 to 2.

6. The process of claim 1, wherein said substance capable of producing formaldehyde under the treatment conditions is selected from the group consisting of 1,3-dimethylolimidazolidone-2, methylolated hydroxyethyl carbamate and tetrakis (hydroxymethyl) phosphonium chloride.

References Cited

UNITED STATES PATENTS

| | | | |
|---|---|---|---|
| 2,123,153 | 7/1938 | Rivat | 8—74X |
| 2,145,011 | 1/1939 | Landolt et al. | 8—74X |
| 2,169,546 | 8/1939 | Widmer et al. | 8—18X |
| 2,322,333 | 6/1943 | Widmer et al. | 8—18X |
| 878,902 | 2/1908 | Sisley | 8—127.6 |
| 2,208,290 | 7/1940 | Glycofrides | 8—128.5 |
| 3,232,692 | 2/1966 | Wilhelm et al. | 8—18 |
| 3,282,639 | 11/1966 | Lundgren et al. | 8—128 |

OTHER REFERENCES

Colour Index; Supplement, 1963; pp. 608–609.

Derbyshire et al., "The Light Fastness of Yellow Wools," Journal Society of Dyers & Colorists, May 1964, pp. 243–248.

Milligan et al., "Studies in Wool Yellowing, Part VII," Textile Research Journal, August 1964, pp. 681–691.

Trotmann, E. R., Dying and Chemical Technology of Textile Fibres, 1964, p. 240.

GEORGE F. LESMES, Primary Examiner

J. R. MILLER, Assistant Examiner

U.S. Cl. X.R.

8—115.6; 117—33.5